(12) United States Patent
Stafford

(10) Patent No.: US 10,973,719 B2
(45) Date of Patent: Apr. 13, 2021

(54) LIFT MECHANISM

(71) Applicant: Scott Duane Stafford, Palm Bay, FL (US)

(72) Inventor: Scott Duane Stafford, Palm Bay, FL (US)

(*) Notice: Subject to any disclaimer, the term of this patent is extended or adjusted under 35 U.S.C. 154(b) by 182 days.

(21) Appl. No.: 16/135,333

(22) Filed: Sep. 19, 2018

(65) Prior Publication Data

US 2019/0231622 A1 Aug. 1, 2019

Related U.S. Application Data

(60) Provisional application No. 62/623,221, filed on Jan. 29, 2018.

(51) Int. Cl.
| | | |
|---|---|---|
| *A61G 7/08* | (2006.01) | |
| *B62B 1/12* | (2006.01) | |
| *B62B 1/14* | (2006.01) | |
| *B66F 5/02* | (2006.01) | |
| *B66F 3/18* | (2006.01) | |

(52) U.S. Cl.
CPC .............. *A61G 7/08* (2013.01); *B62B 1/12* (2013.01); *B62B 1/142* (2013.01); *B66F 5/025* (2013.01); *B62B 2203/07* (2013.01); *B62B 2203/10* (2013.01); *B62B 2203/74* (2013.01); *B66F 3/18* (2013.01)

(58) Field of Classification Search
CPC ...... B66F 3/08; B66F 3/14; B66F 3/16; B66F 3/18; B66F 7/0608; B66F 7/10; B66F 7/12; B66F 7/14; B66F 7/28; B66F 9/06; B66F 9/07504

USPC ................................................. 269/17
See application file for complete search history.

(56) References Cited

U.S. PATENT DOCUMENTS

| | | | |
|---|---|---|---|
| 2,636,626 A | 4/1953 | Ireland et al. | |
| 2,681,740 A | 6/1954 | Schueler et al. | |
| 2,808,163 A | 10/1957 | Petzke et al. | |
| 2,916,170 A | 12/1959 | Osborn et al. | |
| 2,962,730 A * | 12/1960 | Carnes | A61G 7/053 |
| | | | 5/86.1 |
| 4,269,394 A * | 5/1981 | Gray | B66F 13/00 |
| | | | 254/134 |
| 5,123,666 A | 6/1992 | Moore | |
| 5,125,626 A | 6/1992 | Lonsway et al. | |
| 5,632,475 A * | 5/1997 | McCanse | B25H 1/0007 |
| | | | 254/134 |
| 5,687,953 A * | 11/1997 | Huppert | B66F 3/08 |
| | | | 254/100 |
| 5,820,145 A | 10/1998 | Osowski | |
| 6,250,655 B1 | 6/2001 | Sheeks | |
| 6,296,262 B1 | 10/2001 | Skinner | |
| 6,575,481 B1 | 6/2003 | Davis | |
| 6,637,761 B1 | 10/2003 | Boettcher | |

(Continued)

*Primary Examiner* — Orlando E Aviles
*Assistant Examiner* — Robert F Neibaur
(74) *Attorney, Agent, or Firm* — Dunlap Bennett & Ludwig, PLLC

(57) ABSTRACT

A lift mechanism. The lift mechanism includes a base configured to support the lift mechanism in an upright position. A neck is upstanding from the base. A lift bracket is coupled to the neck. A coupling bracket includes a U-shape having a base and arms extending from opposing ends of the base. The base is coupled to the lift bracket. A linear actuator is configured to move the lift bracket up and down along the neck.

7 Claims, 4 Drawing Sheets

(56) References Cited

U.S. PATENT DOCUMENTS

| | | |
|---|---|---|
| 6,796,564 B2 | 9/2004 | Kelly |
| 7,137,161 B2 | 11/2006 | Hempker et al. |
| 8,596,627 B2 * | 12/2013 | Lands .................. B25H 1/0007 |
| | | 254/2 B |
| 9,039,040 B2 * | 5/2015 | Zhang ..................... B62B 1/12 |
| | | 280/769 |
| 2001/0013690 A1 | 8/2001 | Sexton et al. |
| 2005/0040618 A1 | 2/2005 | Beatty |
| 2012/0177469 A1 * | 7/2012 | Robbins .................. B65G 7/12 |
| | | 414/626 |
| 2012/0319064 A1 | 12/2012 | Selkowitz |
| 2013/0161917 A1 | 6/2013 | Trapnell |
| 2016/0137468 A1 * | 5/2016 | Walker .................... B66C 23/48 |
| | | 187/235 |

* cited by examiner

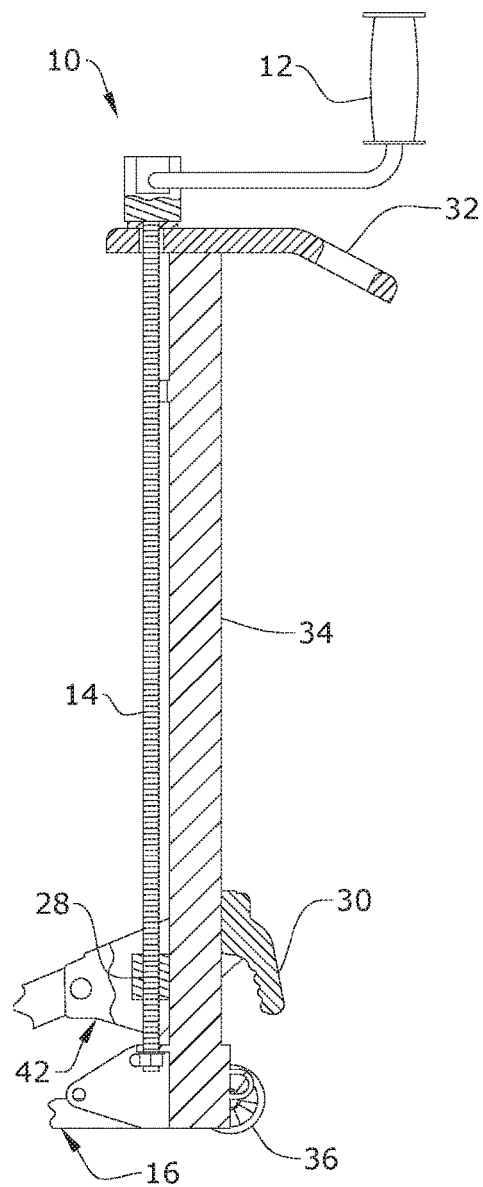
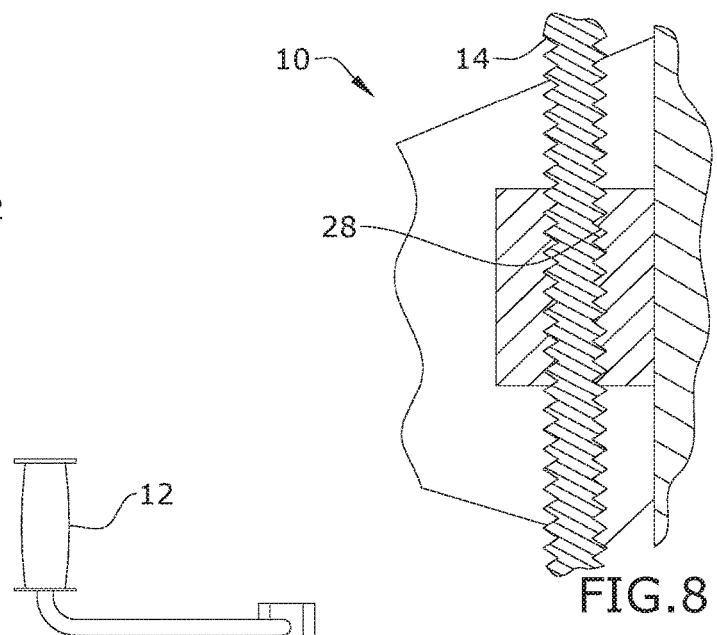
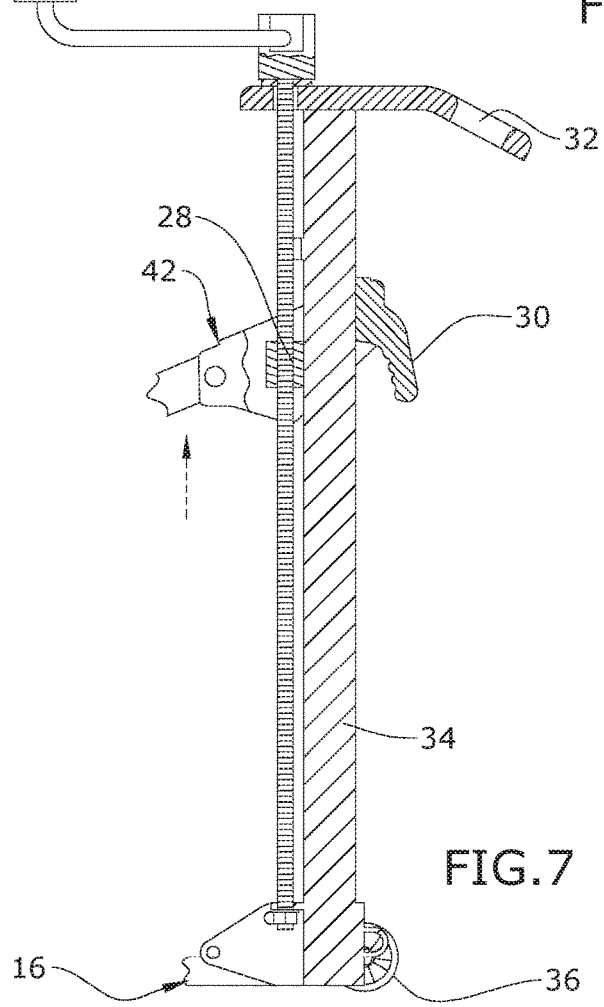
FIG.6
FIG.8
FIG.7

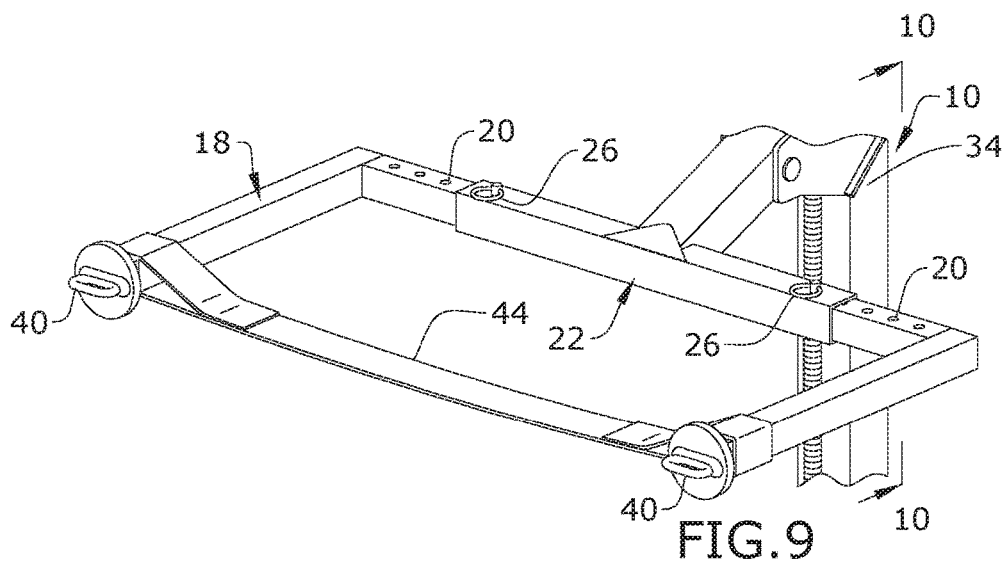
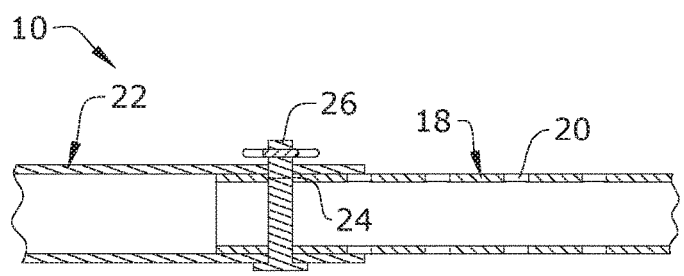
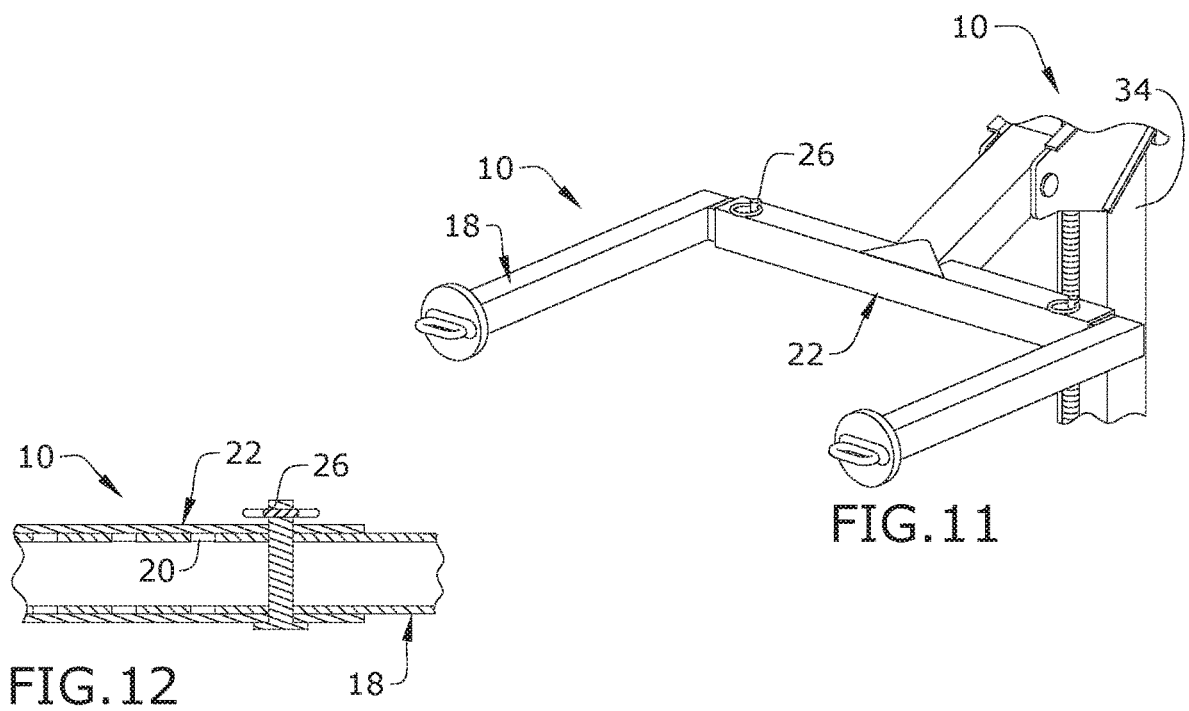

LIFT MECHANISM

CROSS-REFERENCE TO RELATED APPLICATION

This application claims the benefit of priority of U.S. provisional application No. 62/623,221, filed Jan. 29, 2018, the contents of which are herein incorporated by reference.

BACKGROUND OF THE INVENTION

The present invention relates to medical exam tables and, more particularly, to a lift mechanism capable of lifting and moving a medical exam table.

An examination table (or exam table) is used to support patients during medical examinations. During these exams, doctors in offices, clinics, and hospitals use an adjusting mechanism to manipulate and position the table to allow patient support, closer examination of a portion or the entire patient, and the ability to move the patient on and off the table safely. Examination tables often have rolls of paper in which patients sit on, protecting the table. The paper is normally discarded after each patient uses the table.

Examination tables have included electric motors since the 1970s. These are fitted underneath the tabletop and power cables generally detach to prevent a tripping hazard. The ability to transfer power forward and backwards using a reversible electric motor means greater mobility of the examination table. Due to the motorized features, examination tables can weight between 350 and 500 pounds. Under manned movers in medical offices often suffer injuries attempting to lift the heavy examination tables. Hiring additional movers is costly, thus medical facilities try to hire the minimal amount for the job.

As can be seen, there is a need for a mechanism that aids in lifting and moving examination tables.

SUMMARY OF THE INVENTION

In one aspect of the present invention, a lift mechanism comprising: a base configured to support the lift mechanism in an upright position; a neck upstanding from the base; a lift bracket coupled to the neck; a coupling bracket comprising a U-shape having a base and arms extending from opposing ends of the base, wherein the base is coupled to the lift bracket; and a linear actuator configured to move the lift bracket up and down along the neck.

In another aspect of the present invention, a method of lifting a table comprises steps of: providing a lift mechanism comprising: a base configured to support the lift mechanism in an upright position; a neck upstanding from the base; a lift bracket coupled to the neck; a coupling bracket comprising a U-shape having a base and arms extending from opposing ends of the base, wherein the base is coupled to the lift bracket; a first strap extending across the U-shape from arm to arm; and a linear actuator configured to move the lift bracket up and down along the neck; placing the first strap underneath a bottom of the table; attaching a first end of a second strap to a distal end of one of the arms; wrapping the second strap around the table; attaching a second end of the second strap to a distal end of the other of the arms; tightening the second strap to snuggly fit around the table; and activating the actuator and thereby lifting an end of the table upwards.

These and other features, aspects and advantages of the present invention will become better understood with reference to the following drawings, description and claims.

BRIEF DESCRIPTION OF THE DRAWINGS

FIG. 6 is a section detail view of the present invention taken along line 6-6 in FIG. 2;

FIG. 7 is a section detail view of the present invention taken along line 7-7 in FIG. 3;

FIG. 8 is a section detail view of an embodiment of the present invention;

FIG. 9 is a front detail perspective view of an embodiment of the present invention shown in an exemplary arm configuration;

FIG. 10 is a section detail view of the present invention taken along line 10-10 in FIG. 9;

FIG. 11 is a front detail perspective view of an embodiment of the present invention shown in an exemplary secondary arm configuration; and FIG. 12 is a detail section view of an embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, one embodiment of the present invention is a lift that lifts an exam table and makes it possible for one person to raise and move exam tables with little worry of injury to the mover. Advantageously, the lift makes it possible for one person to move a table instead of 2-4 movers.

Figure 1:
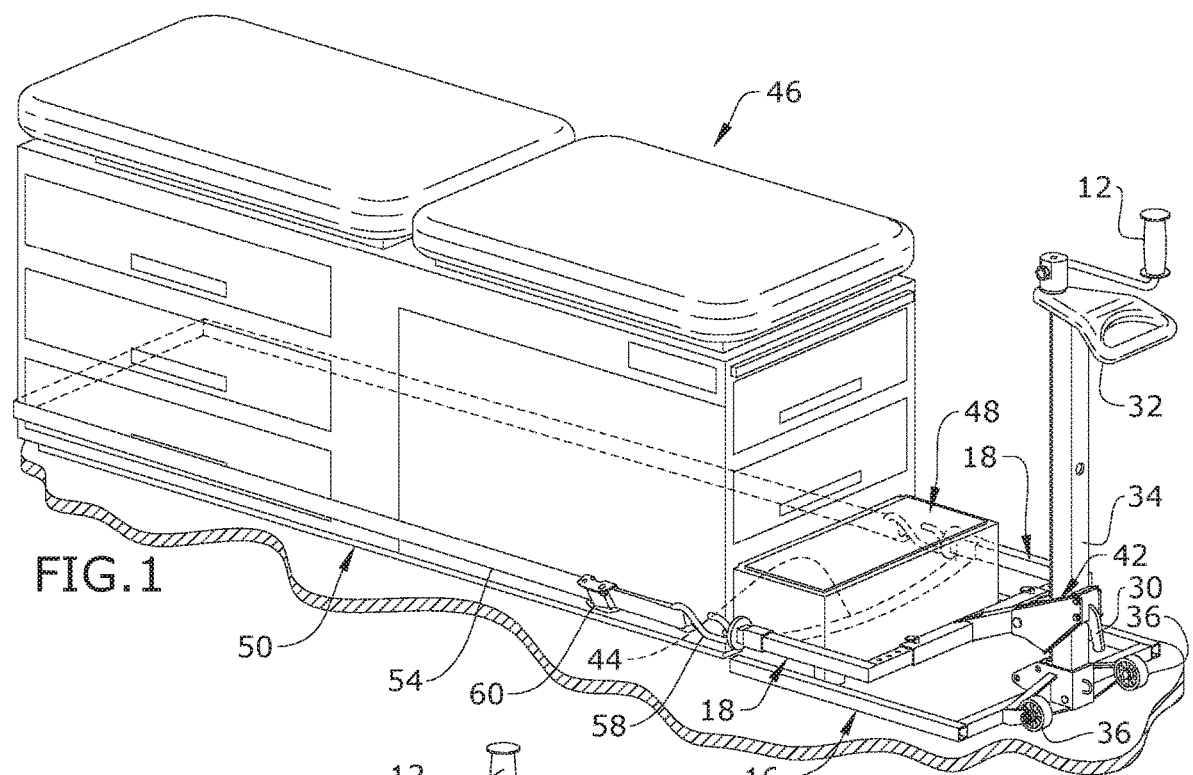
FIG. 1 is perspective view of an embodiment of the present invention shown in use.
Figures 2, 3:
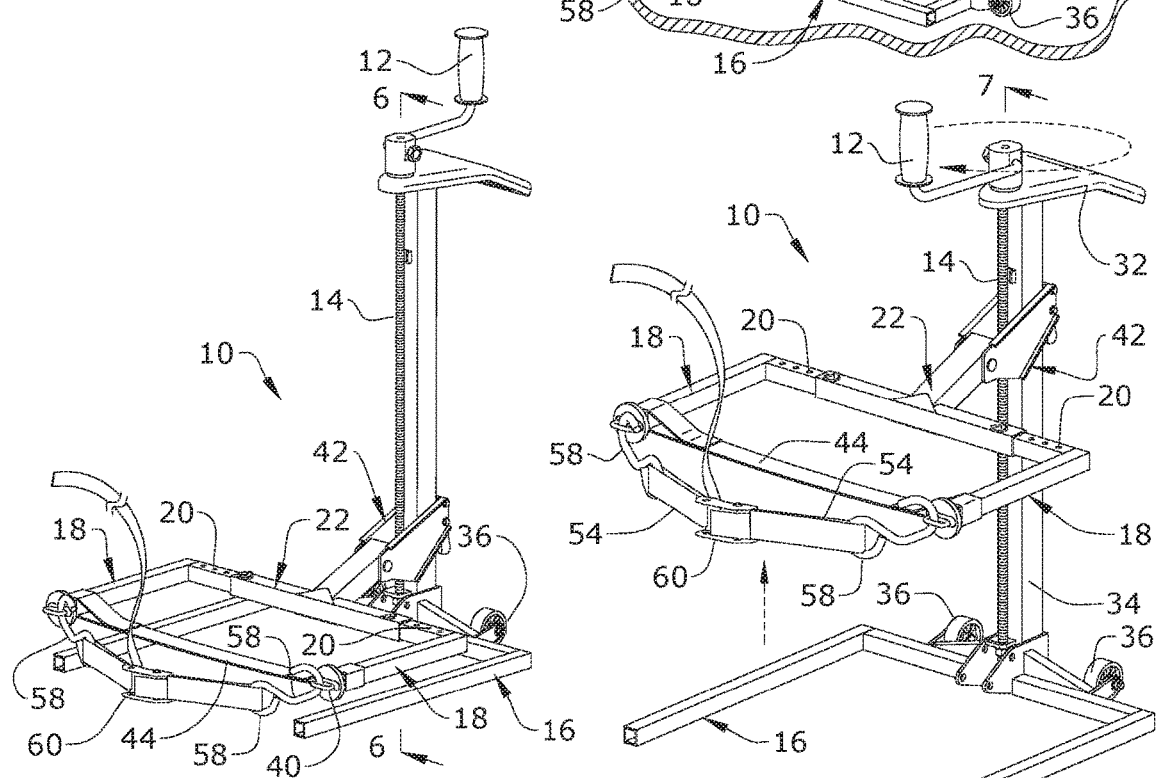
FIG. 2 is a perspective view of an embodiment of the present invention shown in lowered configuration.
FIG. 3 is a perspective view of an embodiment of the present invention shown in raised configuration.
Figure 4:
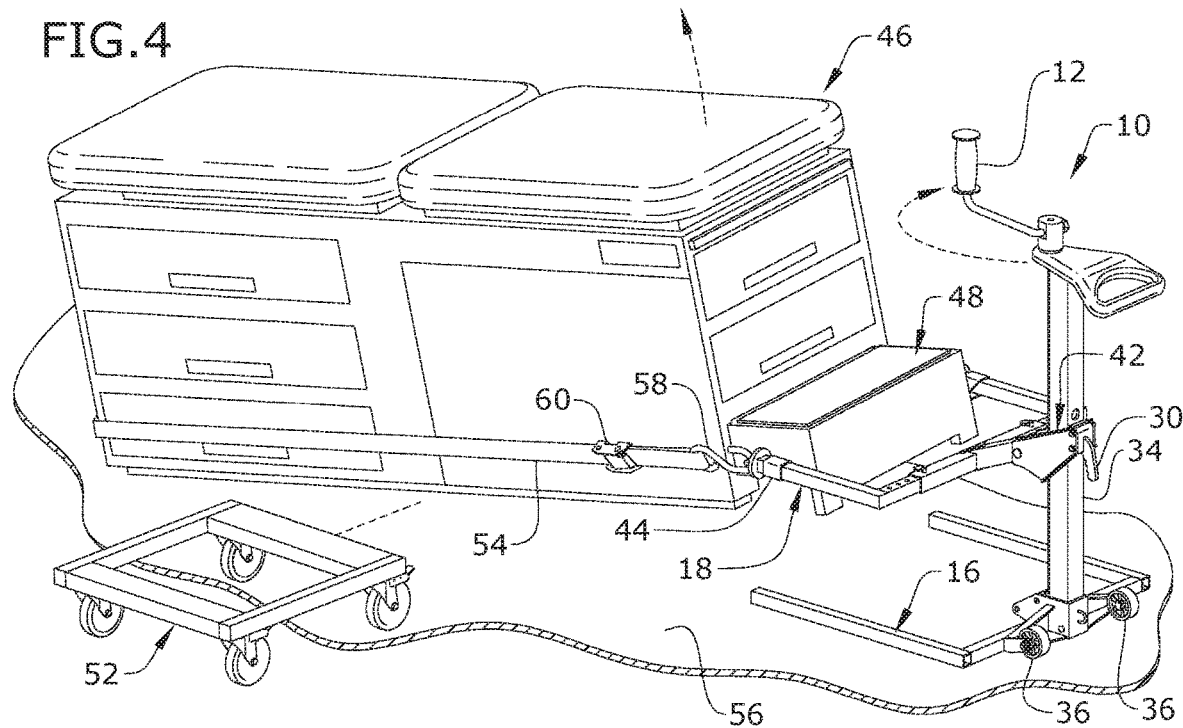
FIG. 4 is perspective view of an embodiment of the present invention shown in raised configuration in use.
Figure 5:
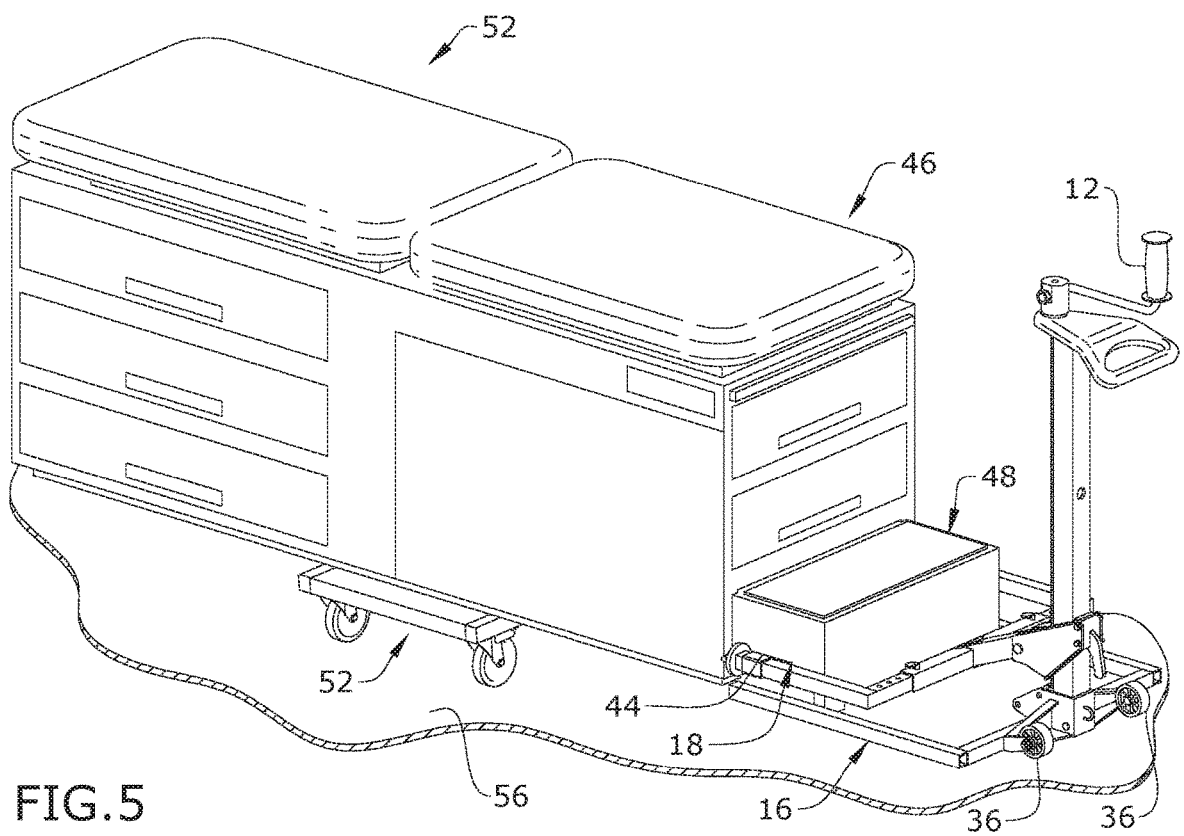
FIG. 5 is a perspective view of an embodiment of the present invention shown in lowered configuration in use

Referring to FIGS. 1 through 11, the present invention includes a lift mechanism 10. The lift mechanism includes 10 a base 16 configured to support the lift mechanism 10 in an upright position. A neck 34 is upstanding from the base 16. A lift bracket 42 is coupled to the neck 34. A coupling bracket 15 includes a U-shape having a base 22 and arms 18 extending from opposing ends of the base 22. The base 22 is coupled to the lift bracket 42. A linear actuator 12, 14 is configured to move the lift bracket 42 up and down along the neck 34.

The linear actuator 12, 14 may be a mechanical actuator, a hydraulic actuator, an electrical actuator, an automated actuator, and the like. For example, the linear actuator 12, 14 may be a mechanical actuator includes a crank handle 12 and a worm gear 14. A bottom end of the worm gear 14 may be coupled to the base 16 and the top end of the worm gear 14 may be coupled to a top of the neck 34. The crank handle 12 is disposed at the top of the neck 34 and is used to rotate the worm gear 14. The lift bracket 42 may include a female threading 28. The female threading 28 engages the worm gear 14 such that when the crank handle 12 is rotated the lift bracket 42 moves up and down the worm gear 14 and thereby up and down the neck 34.

The base 16 of the present invention is used to stabilize the lift mechanism 10 when the lift mechanism is in use. For example, the base 16 may also include a U-shape with arms. The arms may be at a distance apart to provide the base 16 with a wide profile. The wide profile prevents the base 16 from tipping over when the lift mechanism 10 is lifting heavy objects. The base 16 may further include a pair of wheels 36 so that the lift mechanism 10 may be moved around and adjusted as necessary.

The neck 34 of the present invention supports the linear actuator 12, 14 and the lift bracket 42. The neck 34 includes a bottom end coupled to the base 16 and a top end opposite the bottom end. The neck 34 extends vertically from the base. In certain embodiments, a handle 32 is coupled to the top end of the neck 34. The handle 32 and the wheels 36 allow the lift mechanism 10 to be moved around and placed in front of a table 46. Once a dolly 52 is placed under the table 46 after a front end has been lifted, the handle 32 and the wheels 36 may be used to move the table 46.

The lift bracket 42 is operable to lift the coupling bracket 15 up and down along the neck 34 via the linear actuator 12, 14. A handle 30 may be coupled to the lift bracket 42 providing an additional gripping when transporting the table 46. As mentioned above, the coupling bracket 15 includes a U-shape having a base 22 and arms 18 extending from opposing ends of the base 22. A distance between the arms 18 of the coupling bracket 15 is adjustable to adjust to tables 46 with different widths. For example, the arms 18 may each include inserts slidably engaged within slots of the base 22. The inserts include a plurality of openings 20 along a length. The openings 20 align with corresponding openings 24 of the base 22. Lock pins 26 are disposed within the aligned openings 20, 24. To adjust the distance between the arms 18, the lock pins 26 are removed, the inserts are moved within the slots, and the lock pins 26 are inserted into different aligned openings 20, 24.

The present invention may utilize straps 44, 54 to secure the table 46 to the lift mechanism 10. Both straps 44 and 54 may be made of nylon or other strong materials. The first strap 44 is about 24 inches long and may include a tensile strength of thousands of pounds. The second strap 54 may be about 10 ft long. In such embodiments, each of the arms 18 include a chain link 40 coupled to a distal end. A first strap 44 extends across the U-shape from arm 18 to arm 18. The first strap 44 is placed underneath the table 46. A second strap 54 includes a ratchet 60, a first end having a first hook 58, and a second end having a second hook 58. The second strap 54 is wrapped around the side 50 of the table 46 and the first and second hooks 58 releasably secure to the chain links 44. The ratchet 60 is used to tighten the second strap 54 around the table 46.

A method of lifting a table 46 may include the following. Provide the lift mechanism 10 described above. Place the first strap 44 underneath a bottom of the table 46, such as underneath a step 48 of the table 46. Attach the first end of the second strap 54 to the chain link 40 of one of the arms 18. Wrap the second strap 54 around the side 50 of the table 46. Attach the second end of the second strap 54 to the chain link 40 of the other of the arms 18. Tighten the second strap 54 to snuggly fit around the table 46 using the ratchet 60. Activate the actuator 12, 14 by rotating the crank handle 12. An end of the table 46 is lifted upwards from a surface 56 in which it is resting. Place a dolly 52 underneath the rear side of the table 46 and transport the table 46. Advantageously, the lift mechanism 10 allows one mover to lift a 350 to 500 pound table 46 with ease.

It should be understood, of course, that the foregoing relates to exemplary embodiments of the invention and that modifications may be made without departing from the spirit and scope of the invention as set forth in the following claims.

What is claimed is:

1. A lift mechanism comprising:
   a lift mechanism base configured to support the lift mechanism in an upright position;
   a neck upstanding from the lift mechanism base;
   a lift bracket coupled to the neck;
   a coupling bracket comprising a coupling bracket base, a first arm and a second arm extending from opposing ends of the coupling bracket base, wherein the coupling bracket base, the first arm, and the second arm form a U-shape, and wherein the coupling bracket base is coupled to the lift bracket;
   a first strap extending across the coupling bracket from the first arm to the second arm;
   a second strap comprising a ratchet, a first end comprising a first hook, and a second end comprising a second hook; and
   a linear actuator configured to move the lift bracket up and down along the neck;
   wherein a first chain link is coupled to a distal end of the first arm and a second chain link is coupled to a distal end of the second arm, wherein the first hook releasably secures to the first chain link and the second hook releasably secures to the second chain link.

2. The lift mechanism of claim 1, wherein a distance between the first and second arms of the coupling bracket is adjustable.

3. The lift mechanism of claim 2, wherein the first and second arms each comprise inserts slidably engaged within slots of the coupling bracket base, wherein the inserts comprise a plurality of openings along a length of each insert, wherein the openings align with corresponding openings of the coupling bracket base, and lock pins are disposed within the aligned openings of the coupling bracket base and the inserts, respectively.

4. The lift mechanism of claim 1, wherein the linear actuator comprises a crank handle coupled to a worm gear, wherein the worm gear is disposed along the height of the neck and the lift bracket comprises a female threading engaged with the worm gear.

5. The lift mechanism of claim 1, further comprising wheels coupled to the lift mechanism base.

6. The lift mechanism of claim 1, further comprising a handle coupled to the neck.

7. A method of lifting a table comprising steps of:
   providing a lift mechanism comprising:
      a lift mechanism base configured to support the lift mechanism in an upright position;
      a neck upstanding from the lift mechanism base;
      a lift bracket coupled to the neck;
      a coupling bracket comprising a coupling bracket base and two arms extending from opposing ends of the coupling bracket base, wherein the coupling bracket base and the two arms form a U-shape, and wherein the coupling bracket base is coupled to the lift bracket;
      a first strap extending across the coupling bracket from arm to arm; and
      a linear actuator configured to move the lift bracket up and down along the neck;
   placing the first strap underneath a bottom of the table;

attaching a first end of a second strap to a distal end of one of the two arms;
wrapping the second strap around the table;
attaching a second end of the second strap to a distal end of the other of the two arms;
tightening the second strap to snugly fit around the table; and
activating the actuator and thereby lifting an end of the table upwards.

\* \* \* \* \*